(12) United States Patent
Lundström et al.

(10) Patent No.: US 10,502,150 B2
(45) Date of Patent: Dec. 10, 2019

(54) METHOD AND SYSTEM FOR USE WHEN CORRECTING SUPPLY OF AN ADDITIVE TO AN EXHAUST GAS STREAM (71) Applicant: Scania CV AB, Södertälje (SE)

(72) Inventors: Mikael Lundström, Hägersten (SE); Christer Lundberg, Rönninge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/767,340

(22) PCT Filed: Oct. 27, 2016

(86) PCT No.: PCT/SE2016/051048
§ 371 (c)(1),
(2) Date: Apr. 10, 2018

(87) PCT Pub. No.: WO2017/074253
PCT Pub. Date: May 4, 2017

(65) Prior Publication Data
US 2018/0298835 A1  Oct. 18, 2018

(30) Foreign Application Priority Data
Oct. 28, 2015 (SE) ...................... 1551387

(51) Int. Cl.
F01N 9/00 (2006.01)
F02D 41/02 (2006.01)
(Continued)

(52) U.S. Cl.
CPC ......... F02D 41/0235 (2013.01); F01N 3/208 (2013.01); F01N 9/00 (2013.01);
(Continued)

(58) Field of Classification Search
CPC . F01N 3/208; F01N 2560/026; F01N 2610/02
See application file for complete search history.

(56) References Cited

U.S. PATENT DOCUMENTS 9,050,561 B1    6/2015  Shetney et al.
2007/0163240 A1* 7/2007  Nishina ............... F01N 3/208
                                                60/286
(Continued)

FOREIGN PATENT DOCUMENTS

DE    102011003670 A1    8/2012
EP        1681443 A1    7/2006
(Continued)

OTHER PUBLICATIONS

International Search Report for PCT/SE2016/051048 dated Jan. 24, 2017.
(Continued)

Primary Examiner — Jonathan R Matthias
(74) Attorney, Agent, or Firm — Moore & Van Allen PLLC; W. Kevin Ransom (57) ABSTRACT The present invention relates to a method for determining when to correct supply of additive to an exhaust gas stream resulting from combustion in at least one combustion chamber, wherein the additive is arranged for reduction of at least one substance resulting from said combustion by supplying the additive to an exhaust gas stream resulting from said combustion. The quantity of additive being supplied is subjectable to correction, and a sensor is subjected to the exhaust gas stream and arranged to measure occurrence of said at least one substance. The method comprises: by means of sensor signals from said sensor, determining a level of occurrence of said first substance in said exhaust gas stream, and determining when to correct said supply of additive on the basis of said occurrence of said first substance in said exhaust gas stream.

17 Claims, 5 Drawing Sheets (51) Int. Cl.
  *F01N 3/20* (2006.01)
  *F01N 11/00* (2006.01)
  *F02D 41/14* (2006.01)

(52) U.S. Cl.
  CPC .......... *F01N 11/00* (2013.01); *F02D 41/1463* (2013.01); *F01N 2550/05* (2013.01); *F01N 2560/026* (2013.01); *F01N 2560/14* (2013.01); *F01N 2610/02* (2013.01); *F01N 2610/146* (2013.01); *F01N 2900/0416* (2013.01); *F01N 2900/1402* (2013.01); *F01N 2900/1812* (2013.01); *F01N 2900/1818* (2013.01); *F01N 2900/1821* (2013.01); *Y02A 50/2325* (2018.01); *Y02T 10/24* (2013.01); *Y02T 10/47* (2013.01)

(56) References Cited

U.S. PATENT DOCUMENTS

| | | | |
|---|---|---|---|
| 2009/0288394 A1* | 11/2009 | Kesse | F01N 3/208 60/286 |
| 2009/0293451 A1* | 12/2009 | Kesse | F01N 3/2066 60/274 |
| 2011/0083429 A1 | 4/2011 | Sato et al. | |
| 2015/0113958 A1* | 4/2015 | Bauer | F01N 3/208 60/274 |
| 2015/0176456 A1 | 6/2015 | Cho et al. | |
| 2015/0176457 A1 | 6/2015 | Cho et al. | |

FOREIGN PATENT DOCUMENTS

| | | |
|---|---|---|
| JP | 2005133541 A | 5/2005 |
| JP | 2010090796 A | 4/2010 |
| WO | 2016015800 A1 | 2/2016 |

OTHER PUBLICATIONS

Written Opinion of the International Searching Authority for PCT/SE2016/051048 dated Jan. 24, 2017.
SCANIA CV AB, European Application No. 16860389.2, Extended European Search Report, dated Mar. 14, 2019.
Scania CV AB, Korean Application No. 10-2018-7013870, Office Action, dated Jul. 19, 2019.

* cited by examiner

METHOD AND SYSTEM FOR USE WHEN CORRECTING SUPPLY OF AN ADDITIVE TO AN EXHAUST GAS STREAM

CROSS-REFERENCE TO RELATED APPLICATION(S)

This application is a National Stage Application (filed under 35 § U.S.C. 371) of PCT/SE2016/051048, filed Oct. 27, 2016 of the same title, which, in turn claims priority to Swedish Application No. 1551387-2 filed Oct. 28, 2015 of the same title; the contents of each of which are hereby incorporated by reference.

FIELD OF THE INVENTION

The present invention relates to combustion processes, and in particular to methods and systems for correcting supply of additive to an exhaust gas stream resulting from combustion. The present invention also relates to a vehicle, as well as a computer program and a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with internal combustion engines. For example, the exhaust levels of e.g. nitric oxides ($NO_x$), hydrocarbons (HC), carbon monoxide (CO) and particles are regulated for most kinds of vehicles in these standards.

The undesired emission of substances can be reduced by reducing fuel consumption and/or through the use of after-treatment (purifying) of the exhaust gases that results from the combustion process.

Exhaust gases from the internal combustion engine can, for example, be treated through the use of a so-called catalytic process. There exist various kinds of catalytic converters, where different types can be used for different kinds of fuel and/or for treatment of different kinds of substances occurring in the exhaust gas stream. With regard to at least nitric oxides $NO_x$ (such as, for example, nitric oxide NO and nitric dioxide $NO_2$, respectively) heavy vehicles often comprises a method where an additive is supplied to the exhaust gas stream. The additive is supplied in order to, usually through the use of a catalytic converter, reduce the presence of nitric oxides $NO_x$ to less pollutive substances (mainly nitrogen and water vapor). The additive can be injected in the exhaust gas stream resulting from combustion in the internal combustion engine upstream the catalytic converter, and one common type of catalytic converter that is used in $NO_x$ reduction of this kind is Selective Catalytic Reduction (SCR) catalytic converters.

In the supplying of an additive it is essential that the amount of additive that is supplied to the exhaust gas stream is neither too great nor too small. Consequently, it is desirable that the supplied amount of additive corresponds to an expected amount of additive.

SUMMARY OF THE INVENTION

It is an object of the present invention to provide a method and system for determining when to correct the supply of additive to an exhaust gas stream. This object is achieved by a method according to claim 1.

According to the present invention, it is provided a method for determining when to correct supply of additive to an exhaust gas stream resulting from combustion in at least one combustion chamber, wherein the additive is arranged for reduction of at least one substance resulting from said combustion by supplying the additive to an exhaust gas stream resulting from said combustion. The quantity of additive being supplied is subjectable to correction, and a sensor is subjected to the exhaust gas stream and arranged to measure occurrence of said at least one substance. The method includes:

by means of sensor signals from said sensor, determining a level of occurrence of said first substance in said exhaust gas stream, and determining when to correct said supply of additive on the basis of said occurrence of said first substance in said exhaust gas stream.

As was mentioned above, the presence of at least some substances (as is explained below, in the present description and claims, the term substance includes compounds as well) in an exhaust gas stream resulting from combustion can be reduced through the supply of an additive to the exhaust gas stream. A reagent of the additive then reacts with one or more of the substances occurring in the exhaust gas stream to thereby form less hazardous substances.

For example, the supply of additive can be used to reduce the concentration of nitric oxides $NO_x$ such as NO, $NO_2$ or other substances in the exhaust gases resulting from combustion. It is, however, important that the reagent is supplied to the exhaust gas stream in a proportion that corresponds to the presence of the one or more substances/compositions that is to be reduced in order to achieve the desired effect. It is also important that the additive comprises a reagent of a kind that is capable of performing the desired reduction. If a wrong kind of reagent/additive is supplied, and/or if the supplied amount of additive is too small in relation to the presence of the substance/composition to be reduced, undesired surplus of the substance may still remain after the reduction and be emitted into the surroundings.

Conversely, if the amount of reagent and thereby additive being supplied to the exhaust gas stream is high in relation to the at least one substance/composition to be reduced, the supply of additive may cause a surplus of other undesired substances instead. For example, with regard to $NO_x$ reduction using additive comprising a reagent in the form of urea, a surplus of ammonium may be emitted into the surroundings. Ammonium is classified as a hazardous substance, and emissions of ammonium are also often regulated.

The risk for undesired emissions can be reduced by a correction of the supply of additive. That is, it is determined whether the supplied amount actually corresponds to the expected amount of supplied additive, and, when found necessary, the supply is corrected. This correction may be performed at regular/predetermined points in time, in which case the term adaptation is often used to denote the correction.

With regard to correction in general, the correction is a function where a predetermined amount of additive to be supplied for a given situation, such as for a certain operating condition or certain estimated generation of the substance to be reduced, is corrected to account for e.g. variations in the quality of additive being used and/or tolerances/wear of components being involved in the aftertreatment. The correction comprises a change in the predetermined amount, or quantity, to be injected.

Correction can be performed according to a number of different methods, and the invention is applicable irrespective of method being used. Some of the methods being used for correction require that the supply of additive is reduced when the correction is ongoing, which may result in increased emissions. Additional work/production of the substance to be reduced may also be requested from the internal combustion engine. The correction may therefore be intrusive on the overall emissions. As a consequence, corrections may be arranged to be carried out at relatively sparse intervals to avoid unnecessary emissions.

This, however, may render the vehicle being driven at unfavorable emission levels for relatively long periods of time if emissions increase e.g. shortly after a correction has been carried out. For example, correction can be arranged to be performed every 20 hours of driving.

According to the invention, the amount of time that a vehicle is being driven at increased emission levels can be reduced. According to the invention, this is accomplished by means of a method where scheduling of a correction is not static. Instead, emissions of the substance to be reduced are determined, and when to correct the supply of additive is determined on the basis of the determined emissions. In this way, different periods of time between consecutive corrections can be used in dependence of the level of emissions.

According to one embodiment, an interval between consecutive corrections is determined. Furthermore, when determining when to perform correction, the time between consecutive corrections can be reduced on the basis of the occurrence of the substance in the exhaust gas stream. In this way, e.g. longer periods of time between corrections can be used when emissions are low, while shorter periods of time can be used when emissions are higher, so that emissions may be reduced through correction sooner than otherwise would be the case.

The period of time between consecutive corrections can be controlled such that the time between corrections is reduced to a first time for a first level of emission and to a second time for a second level of emission, where the first period of time is shorter than the second period of time when the first level of emission is higher than the second level of emission. This has the advantage that different levels of emissions may be used, where different times between corrections can be used for different levels. For example, two or three or four or more different levels with associated different times between corrections may be utilized. The time between corrections can be controlled such that the time is reduced more in relation to a predetermined time between corrections the higher the occurrence of said first substance in said exhaust gas stream is.

The period of time between consecutive corrections can also be arranged to be controlled as a function of the level of emissions of said first substance. In this way, in principle, the time between corrections may take on any value, e.g. between a minimum time and a maximum time.

Furthermore, it can be determined if the occurrence of the substance in the exhaust gas stream exceeds a first limit, and when this is the case a correction can be initiated. This has the advantage that a correction can be e.g. immediately initiated if the emissions increase to some level, so that a reduction by means of correction can be attempted as soon as possible.

According to one embodiment, it is determined if the occurrence of the substance to be reduced increases substantially instantly, in which case a correction is initiated. Such changes can occur e.g. if a refill of additive is performed by additive of inferior quality. Initiation of correction e.g. immediately when such a change is detected may reduce emissions if possible by increasing the amount being supplied. Whether the occurrence of the substance to be reduced increases substantially instantly can be determined e.g. by determining if the increase, such as a predetermined increase, occurs within a predetermined period of time.

According to embodiments of the invention, the determination of when to correct the supply of additive can be arranged to depend also on a quality of the additive. The quality can be determined using a quality sensor e.g. in the tank containing the additive. For example, time between corrections can be controlled such that the time is reduced more in relation to a predetermined time between corrections when the quality of the additive is lower in comparison to when the quality is higher.

Also, when the occurrence of the substance in the exhaust gas stream exceeds a predetermined level, correction can be arranged to be initiated immediately if the quality of the additive is below a first quality, since in this case even stronger incitement to performing an adaptation is present.

When it is detected that the occurrence of the substance decreases following a change in time between corrections, e.g. due to a performed correction, the time between corrections may be increased from the previously shortened interval.

The invention can be arranged to be utilized in a system where the additive is supplied upstream a catalytic converter and the presence of the at least one substance is determined downstream said catalytic converter.

The invention may be carried out in a vehicle, where the at least one combustion chamber is a combustion chamber of an internal combustion engine in the vehicle. Furthermore, the catalytic converter may be a selective catalyst reduction (SCR) catalytic converter, and the at least one substance may constitute of at least nitric oxides ($NO_x$).

The invention also relates to a system corresponding to the method set forth above. The system is characterized in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

BRIEF DESCRIPTION OF THE DRAWINGS

The invention will be illustrated in more detail below, along with the enclosed drawings.

DETAILED DESCRIPTION OF THE INVENTION

In the following detailed description the present invention will be exemplified for a vehicle. The invention is, however, applicable also in other kinds of transportation means, such as air and water crafts. The invention is also applicable in fixed installations.

Furthermore, the present invention is exemplified below for a urea based additive for reduction of nitric oxides. The present invention is, however, applicable for any kind of suitable additive, where the additive can be arranged for reduction of any substance/compound in the exhaust gas stream, and hence not necessarily nitric oxides.

Further, in the present description and the appended claims the expression "substance" is defined to include chemical compounds as well as mixtures.

Figure 1A:
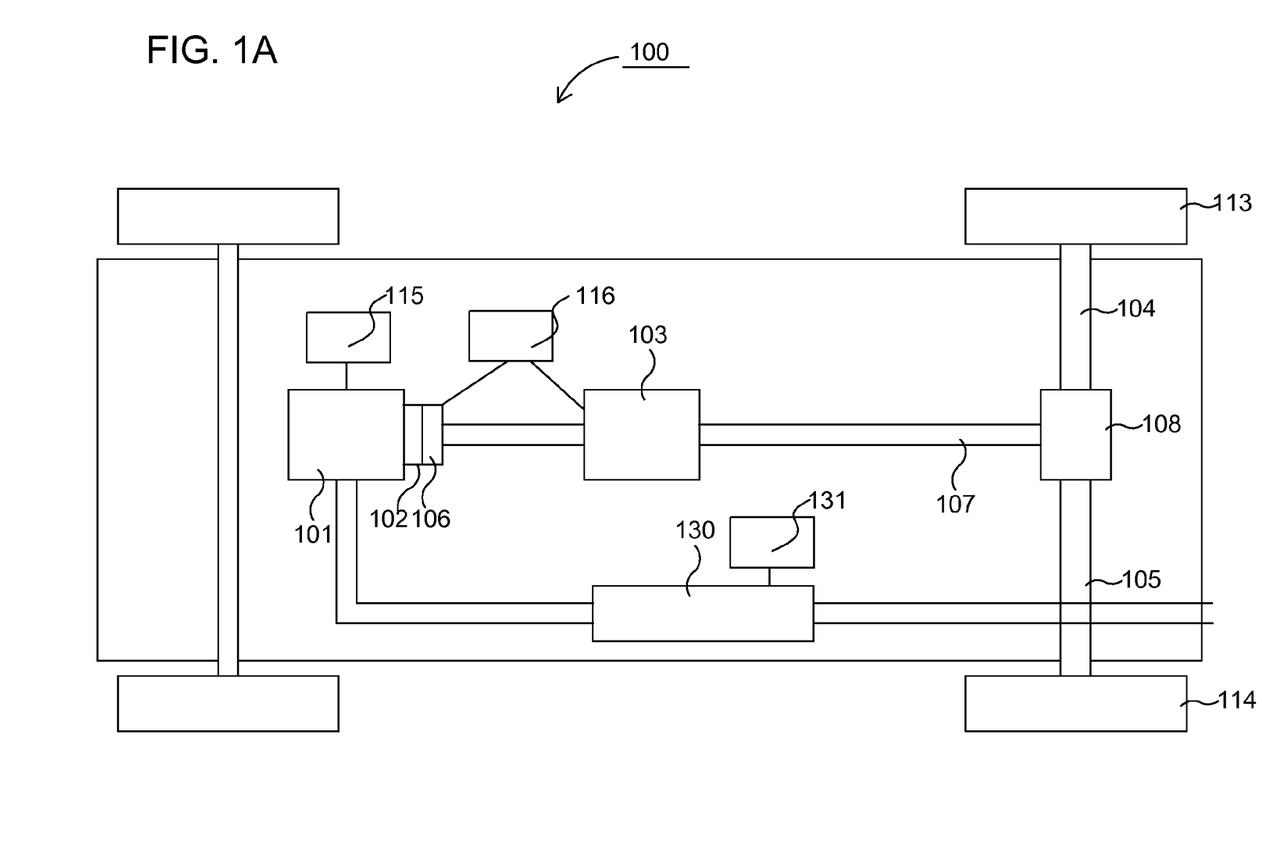
FIG. 1A illustrates a power train of an exemplary vehicle in which the present invention advantageously can be utilized.

FIG. 1A schematically depicts a power train of an exemplary vehicle 100. The power train comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108.

The internal combustion engine 101 is controlled by the vehicle control system via a control unit 115. The clutch 106 and gearbox 103 are also controlled by the vehicle control system by means of a control unit 116.

FIG. 1A, consequently, discloses a powertrain of a specific kind, but the invention is applicable in any kind of power train and also e.g. in hybrid vehicles. The disclosed vehicle further comprises an aftertreatment system 130 for aftertreatment (purifying) of exhaust gases that results from combustion in the internal combustion engine 101. The functions of the aftertreatment system 130 are controlled by means of a control unit 131.

The aftertreatment system 130 can be of various kinds and designs, and according to the disclosed embodiment an additive is supplied to the exhaust gas stream. An example of an aftertreatment system 130 in which the present invention can be utilized is shown more in detail in FIG. 2, and in the disclosed exemplary embodiment the aftertreatment system 130 comprises a selective catalytic reduction (SCR) catalytic converter 201. The aftertreatment system can also comprise further non-disclosed components, such as, for example, further catalytic converters and/or particle filters which can be arranged upstream or downstream the SCR catalytic converter 201.

The supply of additive can, according to the above, for example, be used in the reduction of the concentration of nitric oxides $NO_x$ in the exhausts from the internal combustion engine through the use of an SCR catalytic converter.

This additive can, as according to the disclosed embodiment, for example be an additive comprising urea as reagent and e.g. consist of AdBlue which constitutes a frequently used additive and which consists of a mixture of approximately 32.5% urea dissolved in water. Urea forms ammonium when heated, and the ammonium then reacts with nitric oxides $NO_x$ in the exhaust gas stream. The present invention is applicable when using AdBlue, as well as when using any other urea based additive. As was mentioned above, the invention is also applicable when using any kind of additive comprising other reagents, and where any suitable substance in the exhaust gas stream is reduced/treated using the additive.

Figure 2:
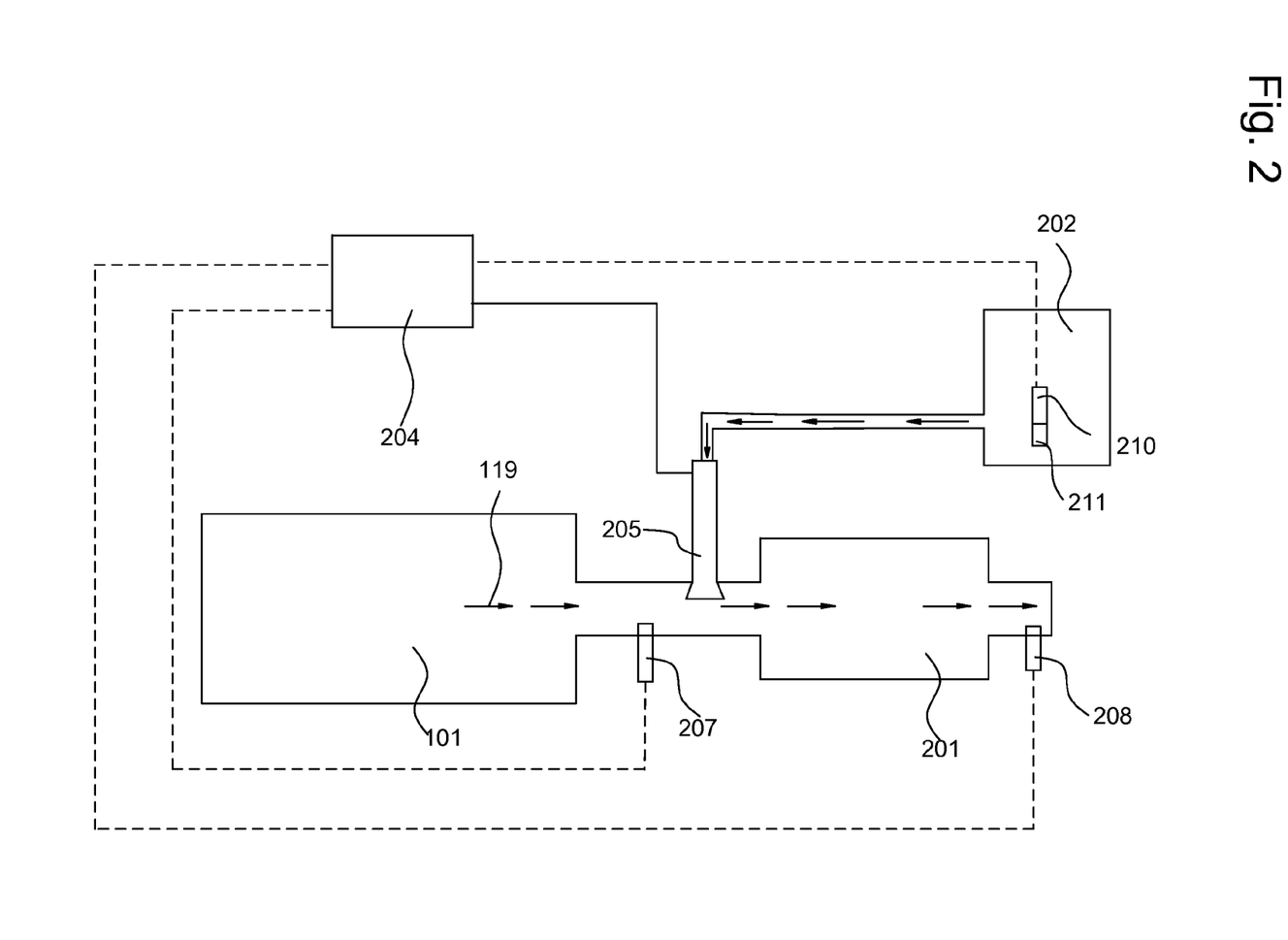
FIG. 2 illustrates an example of an aftertreatment system where a supply of additive is utilized and with which the present invention advantageously can be utilized.

Apart from said catalytic converter 201, FIG. 2 further discloses an additive dosing system, in the disclosed example a urea dosing system (UDS), which comprises a urea, or dosing, tank 202, which is connected to an injection nozzle 205 through the use of which additive is injected into the exhaust gas stream 119. The dosing of urea is controlled by a UDS control unit 204, which generates control signals for controlling the supply of additive so that a desired amount is injected into the exhaust gas stream 119 from the tank 202 using the injection nozzle 205. An armature 210 is arranged in the tank 202 and comprises a quality sensor 211 for diagnosing the quality of the additive.

Dosing systems for the supply of additive are in general well described in the prior art, and the precise manner in which the supply of additive is dosed/performed is therefore not described in detail herein. In general, the dosing varies, in principle, continuously as the operating conditions changes and the generation, in this example, of nitric oxides therewith. Also, an SCR catalytic converter is capable of storing different amounts of ammonium for different prevailing catalytic converter temperatures, as is known per se.

However, the amount of additive actually needed may in reality differ from the predetermined amount being injected, or believed to be injected. This may, for example, be because of various reasons. For example, the amount of additive being supplied may be at an erroneously low or high level. Also, the quality/concentration of the additive may differ from the quality/concentration of the additive for which dozing amounts were determined so that e.g. insufficient amounts of reagent is injected. Further, the mass flow of the exhaust gases entering the aftertreatment may also be at an erroneously low or high level. Another example is that measurement of the substance downstream the supply of additive is erroneous, or a measured or modelled occurrence of the substance to be reduced upstream the supply of additive is not correct. In addition, e.g. wear and/or aging and/or faulty components, such as the catalytic converter, may affect the actual amount being injected. The above factors may also differ from one vehicle to another.

For the above reasons, inter alia, the dosing is subject to correction. Correction can be performed e.g. at regular intervals and aims to ensure that the injected amount of additive corresponds to the actual requirement. For example, a correction factor can be determined and applied to quantities being injected to account for variations according to the above.

Correction can be performed in various ways and be accomplished, for example, by estimating the conversion rate, i.e. reduction rate, of the substance to be reduced, such as e.g. $NO_x$. The conversion rate can, for example be estimated by comparing a presence of $NO_x$ upstream the supply of additive with the presence of $NO_x$ downstream the SCR catalytic converter 201. In this way, it can be determined whether a desired conversion, i.e. reduction, is taking place and thereby whether the supply of additive can be assumed to be performed in a desired manner, or whether there is an unbalance that needs to be corrected. The presence of $NO_x$ upstream the supply of additive and downstream the catalytic converter 201, respectively, can, for example, be determined through the use of $NO_x$ sensors 207, 208 (see FIG. 2). The presence of $NO_x$ upstream the supply of additive can also be determined e.g. by means of a model representation, e.g. taking internal combustion engine operation parameters into account as is known per se.

As was mentioned above, the nature of the corrections may impose additional emissions of undesired substances, and hence correction preferably is not performed too often. For example, $NO_x$ sensors may be cross sensitive to ammonia, and the reduction rate be reduced during correction to reduce the risk for surplus ammonia being mistaken as a presence of $NO_x$.

Figure 3:
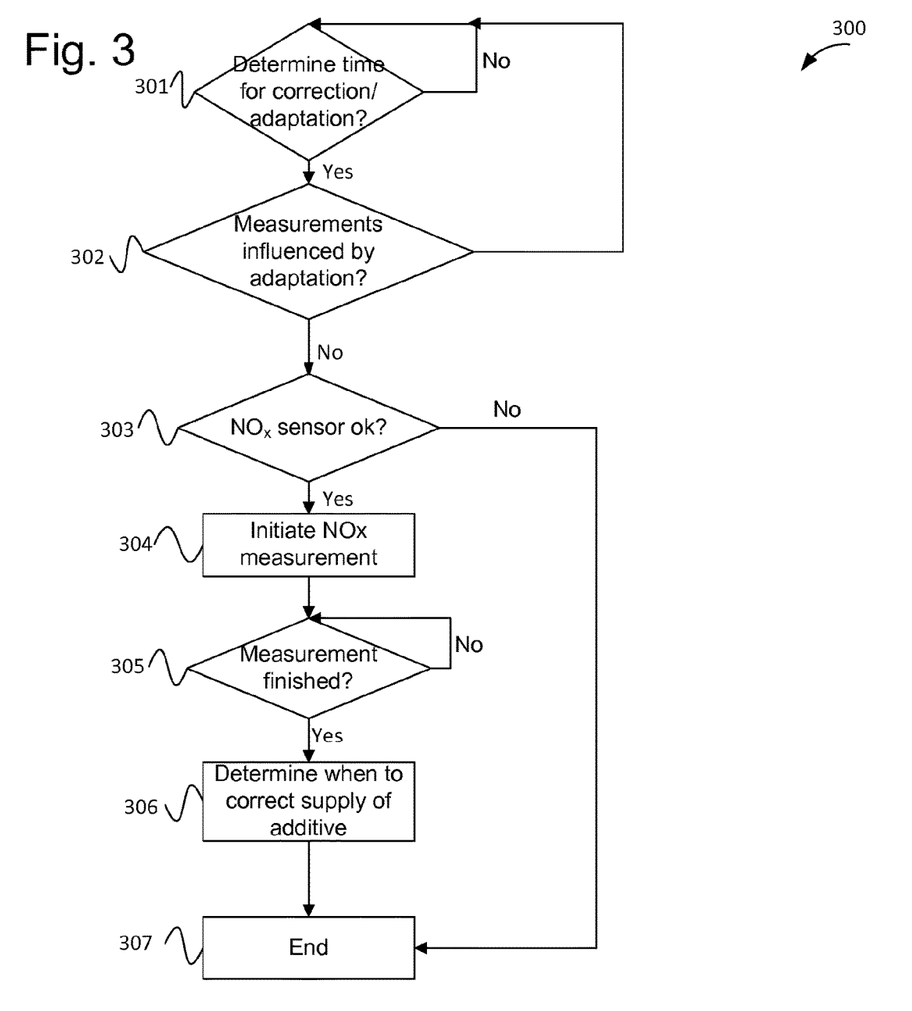
FIG. 3 illustrates an exemplary method according to one embodiment of the present invention.

The present invention relates to a method for controlling when to correct the supply additive, where the method may reduce or increase time between successive corrections in dependence of present conditions. An exemplary method 300 of the present invention is shown in FIG. 3, which method can be implemented at least partly e.g. in the control unit 204 for controlling of the urea dosing system. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 2 depicts only control units 115-116, 130, 204, but vehicles 100 of the illustrated kind are often provided with significantly more control units, as one skilled in the art will appreciate. Control units 115-116, 130, 204 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 204. The determination of when to correct the supply of additive according to the present invention will usually depend on signals being received from other control units and/or vehicle components, and it is generally the case that control units of the disclosed type are normally adapted to receive sensor signals from various parts of the vehicle 100. The control unit 204 will, for example, receive signals e.g. from $NO_x$ sensor 208. Control units of the illustrated type are also usually adapted to deliver control signals to various parts and components of the vehicle, e.g. to the engine control unit or other suitable control unit when tests indicate that performance of the vehicle should be restricted.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see Fig. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc, and be arranged in or in connection with the control unit, whereupon the computer program is executed by the control unit. The behavior of the vehicle in a specific situation can thus be adapted by modifying the instructions of the computer program.

Figure 1B:
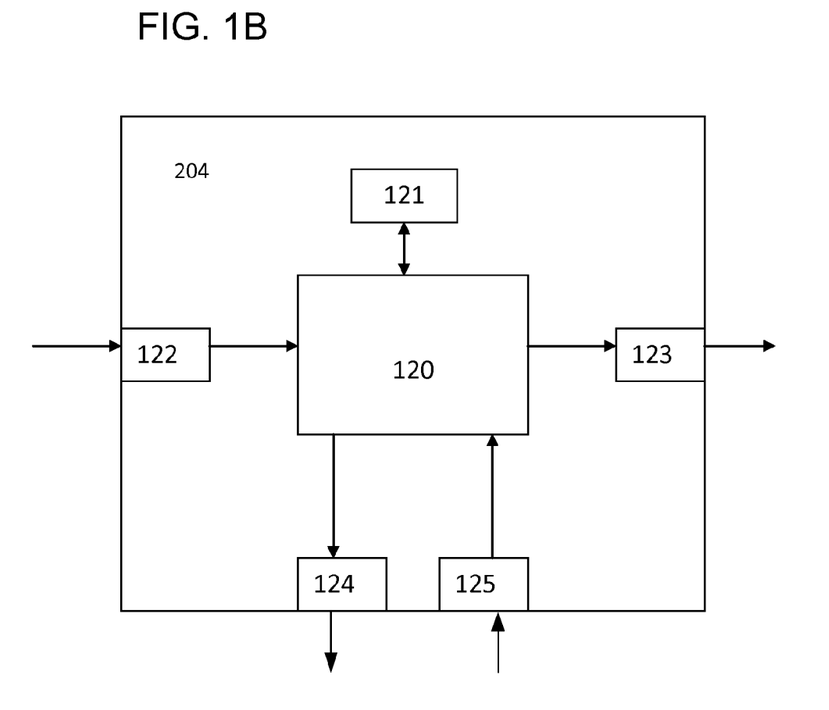
FIG. 1B illustrates an example of a control unit in a vehicle control system.

An exemplary control unit (the control unit 204) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 204 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Returning to the exemplary method 300 illustrated in FIG. 3, the method starts in step 301, where it is determined whether a time for initiating correction of supply of additive is to be determined. The method remains in step 301 for as long as this is not the case. The method continues to step 302 when it is determined that a time for initiating correction of supply of additive is to be determined. The transition from step 301 to step 302 can, for example, be initiated according to various criteria. For example, the determination can be arranged to be performed at regular intervals. Also, the determination can be arranged to be performed e.g. each time the internal combustion engine 101 is started and/or each time there is an indication that a refill of additive has taken place. The method of FIG. 3 may also be arranged to be performed continuously.

In step 302 it is first determined whether measurements may be influenced by a previous correction/adaptation. For example, the performing of a correction may change the amount of surplus additive that has been added and stored in the SCR catalytic converter, which may then affect measurements for some time. Also, the emissions from the internal combustion engine may be increased during correction, so that increased emission levels may remain for some time in the aftertreatment system. According to embodiments of the invention step 302 can be used to ensure that determination of when to perform a correction is not performed until a predetermined time has lapsed since correction was last carried out to ensure that measurements are not affected by internal combustion engine/aftertreatment not being operated as in normal operation.

When it is determined in step 302 that it is considered that measurements will not be influenced by a previous correction/adaptation the method continues to step 303. If it is determined that measurements may be influenced by a previous adaptation the method can be arranged to return to step 301 in FIG. 3, or to remain in step 302 for as long as criteria for transition to step 303 are not fulfilled.

In step 303 it is determined whether it can be assumed that the $NO_x$ sensor 208 is working properly, or whether the sensor 208 is assumed to be malfunctioning. This can, for example, be determined by analyzing the magnitude of received sensor signals, and/or presence or lack of sensor signals. Also, it can be checked whether diagnostic trouble codes have been activated in regard of sensor 208. When the $NO_x$ sensor 208 is determined to be working properly, the method continues to step 304. If it is concluded that $NO_x$ sensor 208 is not working properly, the method can be ended in step 307. Simultaneously one or more appropriate trouble codes can be activated if not already activated for later attendance when the vehicle is taken to service.

In step 304 a measurement of the emissions of the substance being reduced, e.g. $NO_x$, is started to determine the occurrence of the substance in the exhaust gas stream. This measurement can be arranged to be performed for some time, where emissions of $NO_x$ are accumulated for the period of time measurements are ongoing. The measurements can also be arranged to be performed for a period of time during which the internal combustion engine produces some suitable amount of work, e.g. in terms of kWh. If measurement is performed for a period of time, the amount of work being produced by the internal combustion engine can also be arranged to be determined so as to be able to determine emissions per unit work of the internal combustion engine 101. The initiation of the measurements in step 304 can also be arranged to take further criteria into account. For example, the current driving conditions can be taken into account, where measurements can be postponed if transient changes are frequent, and measurements be postponed until the driving conditions are more appropriate for measurement. Also, it can be required that the internal combustion engine produces at least a predetermined work so that measurements are not performed when engine load is too low.

In step 305 it is determined whether the measurements are finished, and the method remains in step 305 for as long as this is not the case. When measurements are finished the method continues to step 306.

In step 306 it is determined when to perform a correction/adaptation of the supply of additive on the basis of the occurrence of the substance, e.g. $NO_x$, in the exhaust gas stream that has been determined in steps 304-305.

With regard to correction, the correction is, as was mentioned above, in general intrusive, i.e. affects overall emissions in a negative way when the correction is carried out. For this reason it is desired that corrections of the supply of additive is not performed more frequent than necessary. In general correction is performed at regular intervals, or certain occasions. For example, correction may be arranged to be carried out every x hours of driving. According to the prior art, it is determined beforehand when correction is carried out.

In step 306, instead, it is determined when to perform correction on the basis of the occurrence of the substance to be reduced in the exhaust gas stream. Depending on the occurrence, e.g. a suitable time for performing correction or frequency at which correction is to occur, is determined. For example, if the occurrence of the substance in the exhaust gas stream is low, correction can be arranged to be performed less frequently, while higher occurrences can be arranged to trigger more frequent corrections. This is exemplified further with reference to FIG. 4.

Figure 4:
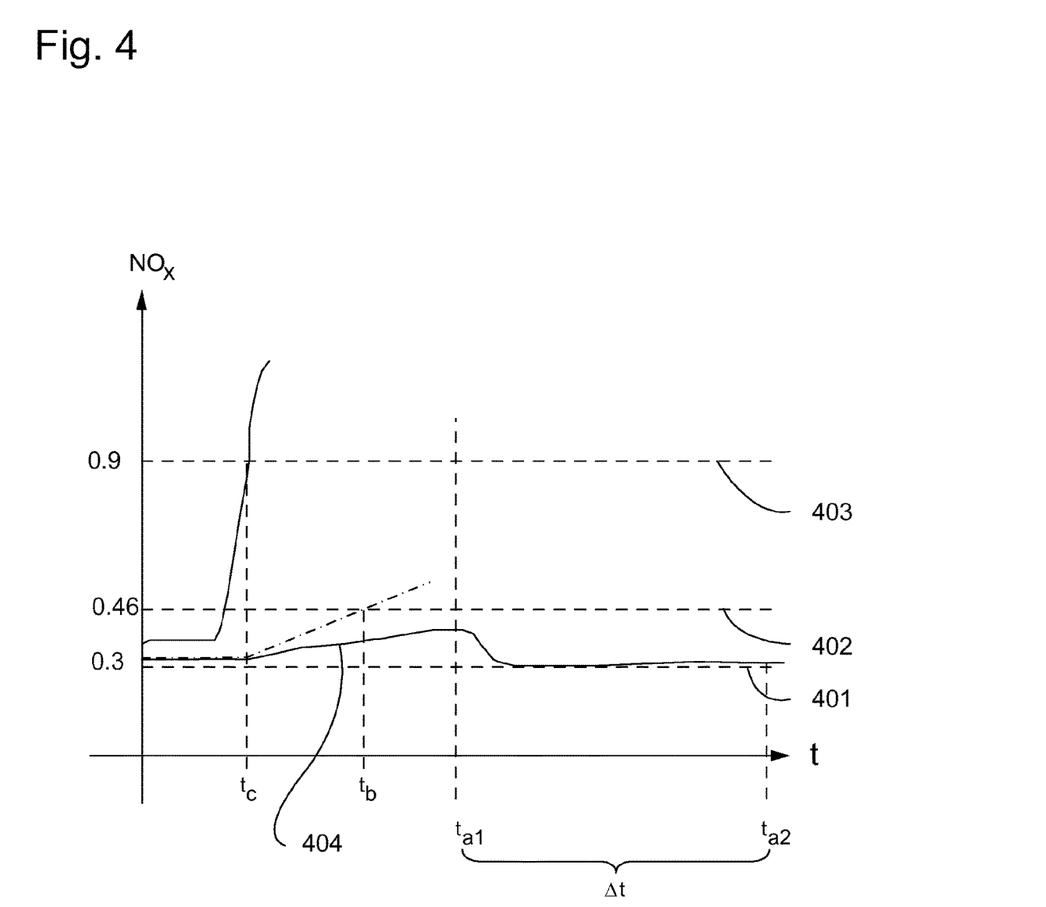
FIG. 4 illustrates variations in emissions of a substance for different scenarios.

FIG. 4 discloses a graph over variation in time of the occurrence of e.g. $NO_x$ in the exhaust gas stream. The disclosed emissions for each point in time in FIG. 4 correspond to an averaged value calculated during some suitable period of time or amount of work produced by the internal combustion engine 101. Further, the y-axis represents emissions per unit work, in the disclosed example expressed in grams of substance per kWh produced by the internal combustion engine 101. Hence, FIG. 4 discloses changes over time relating to actual emissions per unit work and not variations in regard of work produced by the internal combustion engine 101.

FIG. 4 further discloses three dashed horizontal lines, representing different levels of emission. Horizontal line 401 represents e.g. a target value for the emissions, i.e. the preferred maximum emissions during operation of the vehicle. Line 402 represents, in this example, a legislative limit, i.e. an emission limit that corresponds to the maximum level of emissions that is allowed according to legislation, e.g. expressed in grams per kWh produced by the engine 101. Line 403 represents a further level of emissions being used in the current example.

According to the present example, for as long as the emission levels are below the legislative limit 402 the frequency at which corrections are carried out are kept in step 306 at a first frequency, e.g. every 20 or 40 hours, or any other suitable frequency. This is exemplified by corrections at times $t_{a1}$ and $t_{a2}$, where at time $t_{a1}$ an adaptation is also required, since emissions have begun to increase. The adaptation at time $t_{a2}$ may, when this time comes, be arranged to be postponed further or skipped altogether since emissions indicate that adaptation is not necessary and may actually have the only result in increasing emissions due to the intrusive impact of the adaptation. Alternatively, corrections are arranged to always be performed at least with a certain interval.

When the emissions exceed the limit 402, indicated at $t_b$, and hence also exceeds legislatively allowed emissions, the period of time Δt (exemplified for the time between corrections at times $t_{a1}$ and $t_{a2}$) between corrections is reduced in step 306. For example, the time between corrections can be reduced to e.g. any percentage in the interval 0%-90%, or 30%-70% of the regular, or maximum interval between correction being used, or any other suitable reduction of the interval between adaptations. In this way, an attempt to reduce emissions by means of correction will be performed sooner than otherwise would be the case. Also, an upcoming correction can be scheduled to occur sooner than otherwise would be the case, e.g. at time $t_b$ or within some suitable time from when it is determined that emissions exceed the limit 402. The reduced interval between adaptations can be upheld until emissions have been reduced to, and remained, values below the line 402 for a predetermined time.

Furthermore, FIG. 4 discloses a further limit 403, higher than limit 402 and hence further exceeding legislatively allowed emissions. In this situation, the period of time between adaptations can be arranged to be reduced even further in step 306 than when exceeding limit 402. For example, the time between adaptations can be reduced to e.g. any suitable percentage being lower than the percentage utilized between limit 401 and 402. Consequently, the higher the emissions, the shorter intervals between adaptations can be used.

FIG. 4 also discloses a further example. At time $t_c$ there is a substantial and relatively sudden increase in emissions.

This can be the case, for example, if the vehicle is refilled with a wrong kind of additive. According to one embodiment, it is further determined whether there is a substantial change in emissions, e.g. an increase exceeding a predetermined percentage and e.g. within a predetermined period of time. In situations of this kind correction can be arranged to be initiated immediately when the increase is detected. In addition the time between adaptations can be reduced according to the above. The immediate initiation of a correction can be arranged to be carried out only when there is an increase in emissions exceeding a predetermined difference in emissions or e.g. when the emissions exceed a predetermined limit.

Furthermore, when it is determined in step 306 that the time between adaptations is to be reduced it can be further determined the time lapsed since the previous adaptation, and when the time lapsed exceeds the time determined in step 306 adaptation can be arranged to be immediately initiated.

FIG. 4 discloses three different levels of emissions, and in step 306 the time between adaptations is reduced in dependence of the emissions. It is possible to use any number of levels of emissions, and it is also contemplated that time between adaptations is controlled as a function of emissions and hence can take on substantially any interval independence of the emissions. The method of FIG. 3 can also be arranged to be carried out at any suitable time, and hence the determined time between adaptations can be arranged to vary with variations in emissions, even continuously.

Furthermore, as was mentioned above the dosing system may include a quality sensor 211 by means of which e.g. chemical composition of an additive can be evaluated. Signals from such sensors can be used in combination with sensor signals from the exhaust gas sensor. According to embodiments of the invention, the determining of when to perform a correction can be performed using a combination of sensor signals from the exhaust gas sensor such as $NO_x$ sensor 208 and signals from the quality sensor 211.

For example, the time between adaptations can be arranged to depend also on a quality of the additive indicated by the quality sensor 211. E.g., if the quality is lower, shorter periods of time between adaptations for a given emission can be used than when the estimated quality is higher. Also, the quality of the additive can be used to determine if an immediate adaptation is to be performed. According to embodiments of the invention, immediate adaptation can be performed e.g. if the emissions exceeds a certain level and the quality is below a first quality.

The present invention, consequently, provides a solution where time between corrections is allowed to vary in dependence of the emissions. In this way, emissions may be reduced sooner since correction may be performed more often when emissions increase. Furthermore, when emissions are lower correction can be performed less frequent so that increased emissions due to intrusive correction can be reduced.

Finally, the present invention has been exemplified for a vehicle. The invention is, however, applicable in any kind of craft, such as, e.g., aircrafts, watercrafts and spacecrafts. The invention is also applicable for use in combustion plants. Also, the aftertreatment system may comprise further components such as one or more particle filters, one or more oxidation catalytic converters as is known per se. It is also contemplated that the aftertreatment system may comprise more than one SCR catalytic converter.

The invention claimed is:

1. A method for determining when to correct supply of additive to an exhaust gas stream resulting from combustion in at least one combustion chamber, wherein the additive is arranged for reduction of at least one substance resulting from said combustion by supplying the additive to an exhaust gas stream resulting from said combustion, wherein the quantity of additive being supplied is subjectable to correction, and wherein a sensor is subjected to the exhaust gas stream and arranged to measure occurrence of said at least one substance, the method comprising:
   by means of sensor signals from said sensor, determining a level of emission of said first substance in said exhaust gas stream; and
   determining a length of at least one interval between corrections to said supply of additive to the exhaust gas stream, where the length of the at least one interval is based on said level of emission of said first substance in said exhaust gas stream.

2. A method according to claim 1 further comprising, when determining when to perform correction:
   reducing the time between consecutive corrections on the basis of said occurrence of said first substance in said exhaust gas stream.

3. A method according to claim 1 further comprising, when determining when to perform correction:
   controlling a period of time between consecutive corrections as a function of the level of emissions of said first substance.

4. A method according to claim 1 further comprising, when determining when to perform correction:
   controlling a period of time between consecutive corrections such that the time is reduced to a first time for a first level of emission and to a second time for a second level of emission, said first time being shorter than said second time when said first level of emission is higher than said second level of emission.

5. A method according to claim 1 further comprising:
   reducing the time between consecutive corrections such that the time is reduced more in relation to a predetermined time between consecutive corrections the higher the occurrence of said first substance in said exhaust gas stream is.

6. A method according to claim 1 further comprising:
   determining if said occurrence of said first substance in said exhaust gas stream exceeds a first limit; and
   initiating a correction when said occurrence of said first substance in said exhaust gas stream exceeds said first limit.

7. A method according to claim 1 further comprising:
   determining if said occurrence of said first substance in said exhaust gas stream increases substantially instantly; and
   initiating a correction when said occurrence of said first substance in said exhaust gas stream increases substantially instantly.

8. A method according to claim 1 further comprising:
   determining when to correct said supply of additive on the basis of said occurrence of said first substance in said exhaust gas stream and a quality of the additive.

9. A method according to claim 8 further comprising:
   reducing the time between consecutive corrections such that the time is reduced more in relation to a predetermined time between consecutive corrections the lower the quality of said additive is.

10. A method according to claim 1 further comprising:
determining if said occurrence of said first substance in said exhaust gas stream exceeds a predetermined level; and
initiating a correction when said occurrence of said first substance in said exhaust gas stream exceeds said predetermined level and a quality of the additive is below a first quality.

11. A method according to claim 1 further comprising:
increasing the time between consecutive corrections when the occurrence of said first substance in said exhaust gas stream decreases following a correction.

12. A method according to claim 1 further comprising:
determining when to correct supply of additive in a system where said first additive is supplied upstream a first catalytic converter and said presence of said at least one substance is determined downstream said catalytic converter.

13. A method according to claim 1 further comprising:
determining said emissions as a quantity per unit work produced by said at least one combustion chamber.

14. A method according to claim 1, wherein said at least one combustion chamber is a combustion chamber of an internal combustion engine in a vehicle.

15. A computer program product comprising computer program code stored on a non-transitory computer-readable medium, said computer program product for determining when to correct supply of additive to an exhaust gas stream resulting from combustion in at least one combustion chamber, wherein the additive is arranged for reduction of at least one substance resulting from said combustion by supplying the additive to an exhaust gas stream resulting from said combustion, wherein the quantity of additive being supplied is subjectable to correction, and wherein a sensor is subjected to the exhaust gas stream and arranged to measure occurrence of said at least one substance, said computer program product comprising computer instructions to cause one or more computer processors to perform the following operations:
by means of sensor signals from said sensor, determining a level of emission of said first substance in said exhaust gas stream; and
determining a length of at least one interval between corrections to said supply of additive to the exhaust gas stream, where the length of the at least one interval is based on said level of emission of said first substance in said exhaust gas stream.

16. A system for determining when to correct supply of additive to an exhaust gas stream resulting from combustion in at least one combustion chamber, wherein the additive is arranged for reduction of at least one substance resulting from said combustion by supplying the additive to an exhaust gas stream resulting from said combustion, wherein the quantity of additive being supplied is subjectable to correction, and wherein a sensor is subjected to the exhaust gas stream and arranged to measure occurrence of said at least one substance, the system comprising:
means for, by means of sensor signals from said sensor, determining a level of occurrence of said first substance in said exhaust gas stream; and
means for determining a length of at least one interval between corrections to said supply of additive to the exhaust gas stream, where the length of the at least one interval is based on said level of emission of said first substance in said exhaust gas stream.

17. A vehicle comprising a system for determining when to correct supply of additive to an exhaust gas stream resulting from combustion in at least one combustion chamber, wherein the additive is arranged for reduction of at least one substance resulting from said combustion by supplying the additive to an exhaust gas stream resulting from said combustion, wherein the quantity of additive being supplied is subjectable to correction, and wherein a sensor is subjected to the exhaust gas stream and arranged to measure occurrence of said at least one substance, the system comprising:
means for, by means of sensor signals from said sensor, determining a level of occurrence of said first substance in said exhaust gas stream; and
means for determining a length of at least one interval between corrections to said supply of additive to the exhaust gas stream, where the length of the at least one interval is based on said level of emission of said first substance in said exhaust gas stream.

* * * * *